United States Patent [19]

Kawakami et al.

[11] Patent Number: 5,613,261
[45] Date of Patent: Mar. 25, 1997

[54] CLEANER

[75] Inventors: Yuichi Kawakami, Itami; Takayuki Hamaguchi, Takarazuka; Nobukazu Kawagoe, Toyonaka; Hideaki Nakanishi, Ibaraki; Natsuko Waki, Jyoyo, all of Japan

[73] Assignee: Minolta Co., Ltd., Osaka, Japan

[21] Appl. No.: 420,652

[22] Filed: Apr. 12, 1995

[30] Foreign Application Priority Data

Apr. 14, 1994 [JP] Japan .................................. 6-075915

[51] Int. Cl.⁶ .................................................. A47L 11/14
[52] U.S. Cl. ........................ 15/98; 15/319; 15/340.1; 15/491; 15/50.1; D15/52
[58] Field of Search .................... 15/319, 49.1, 50.1, 15/50.2, 50.3, 52.1, 52.2, 98, 339, 320

[56] References Cited

U.S. PATENT DOCUMENTS

| | | | |
|---|---|---|---|
| 3,952,361 | 4/1976 | Wilkins | 15/319 |
| 4,680,827 | 7/1987 | Hummel | 15/319 |
| 4,937,912 | 7/1990 | Kurz . | |
| 5,163,202 | 11/1992 | Kawakami et al. | 15/319 |
| 5,265,300 | 11/1993 | O'Hara et al. | 15/320 |
| 5,341,540 | 8/1994 | Soupert et al. | 15/319 |

FOREIGN PATENT DOCUMENTS 2-131734  5/1990  Japan .
3-242710  10/1991  Japan .

*Primary Examiner*—David Scherbel
*Assistant Examiner*—Randall E. Chin
*Attorney, Agent, or Firm*—Burns, Doane, Swecker & Mathis, LLP

[57] ABSTRACT

A cleaner comprises a driving unit which moves the cleaner, a cleaner unit which cleans an object to be cleaned, a sensor by which a degree of dirt on the object is detected, and a driving controller which controls the driving unit on the basis of the detected degree of dirt. The cleaner unit further comprises a controller which compares the degrees of dirt detected by the sensor before and after a cleaning operation.

26 Claims, 5 Drawing Sheets

CLEANER

BACKGROUND OF THE INVENTION

1. Field of the Invention

The present invention relates to a cleaner of a moving type which automatically cleans an object to be cleaned.

2. Description of the Related Art

In the field of conventional cleaners, various cleaners of moving types have been proposed to automate cleaning by adding functions such as a driving unit and drive control unit to a cleaning device.

The aforesaid conventional moving-type cleaners provide only sponges, brushes or the like to clean an object on a predetermined route and do not provide means for the degree of dirt on the object to be cleaned.

The aforesaid cleaners have certain disadvantages insofar as, the most severely soiled areas are inadequately cleaned when the moving speed is set fast for the purpose of cleaning a predetermined range in a short time, and, conversely, the time required to clean the entire object is increased when the moving speed is set slow for the purpose of carefully cleaning a soiled area. A further disadvantage is that the cleaning operation is performed on all areas, including all unsoiled areas.

SUMMARY OF THE INVENTION

A first object of the present invention is to provide a cleaner for rapidly cleaning a predetermined cleaning range by thoroughly cleaning only severely dirty areas.

A second object of the present invention related to the first object is to provide a cleaner which, after a predetermined cleaning operation, determines by judging cleaning effectiveness whether or not dirt has been dropped by a cleaning operation or no dirt has been dropped by a cleaning operation such that a floor may be damaged so as to preponderantly clean an area.

The aforesaid first object of the cleaner of the present invention is achieved by a cleaner provided with a sensor for detecting the degree of dirt of an object being cleaned, and a driving controller for controlling the movement of the cleaner in accordance with the degree of dirt of an object being cleaned.

The aforesaid second object of the cleaner of the present invention is achieved by a cleaner provided with a controller for judging the cleaning effect by comparing the degree of dirt of an object being cleaned before and after a cleaning operation.

BRIEF DESCRIPTION OF THE DRAWINGS

The above objects and features of the present invention are set forth with particularity in the appended claims. The present invention, both as to its organization and manner of operation, together with further objects and advantages thereof, may best be understood by reference to the following detailed description taken in conjunction with the accompanying drawings.

DETAILED DESCRIPTION OF THE PREFERRED EMBODIMENTS

The preferred embodiments of the present invention are described in terms of an free-running floor cleaner example with reference to the accompanying drawings.

Figure 1:
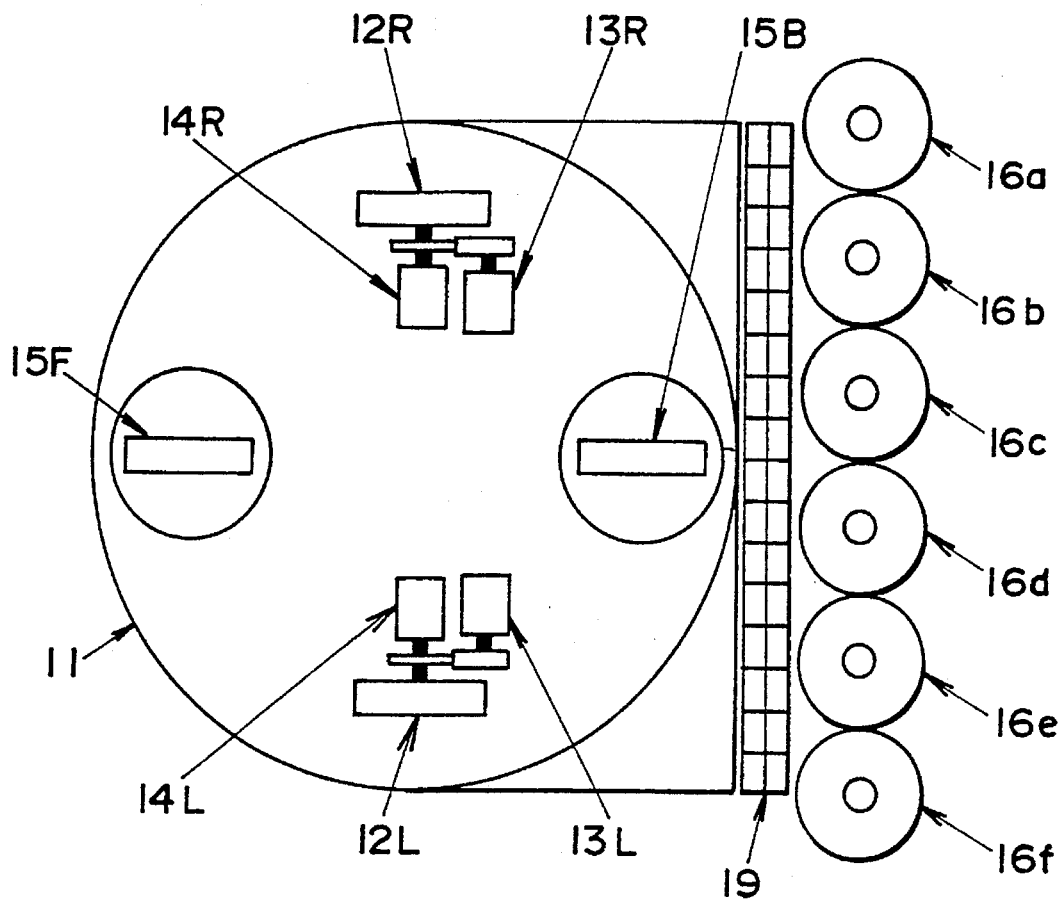
FIG. 1 is a bottom view of an embodiment of the cleaner of the present invention.
Figure 2:
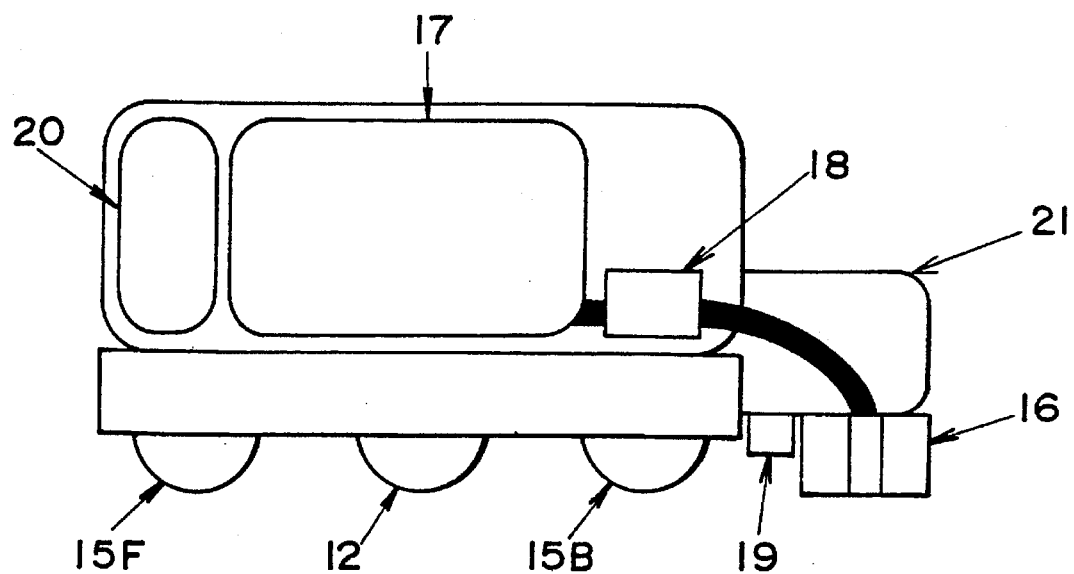
FIG. 2 is a vertical section view of an embodiment of the cleaner of the present invention.

FIGS. 1 and 2 show the overall construction of an embodiment of an free-running floor cleaner of the present invention. FIG. 1 is a bottom view, and FIG. 2 is a vertical section view.

In FIG. 1, reference number 11 refers to the floor cleaner housing, reference numbers 12L and 12R refer to the drive wheels provided bilaterally on the bottom of said cleaner 11, and which are independently driven by drive motors 13L and 13R. Reference numbers 14L and 14R are rotation sensors comprising rotary encoders or the like connected to the respective drive wheels, and which can detect the current position by measuring the distance travelled by detecting the number of rotations of drive wheels 12L and 12R. Reference numbers 15F and 15B refer to driven wheels mounted at the front and back on the bottom of cleaner 11. The drive unit is constructed so as to move cleaner 11 by the aforesaid drive wheels 12L and 12R, drive motors 13L and 13R, and driven wheels 15F and 15B. The direction of advance of the cleaner is in the leftward direction in the drawing.

Reference numbers 16a~16f refer to sponges mounted on the back section of cleaner 11, and which are cylindrical in shape and the bottoms of which are pressed against the floor. Each sponge 16a~16f is rotated on its axis by a motor not shown in the drawings so as to scrub the floor. Sponges 16a~16f are retracted from the floor surface simultaneously by a retraction unit 21 as shown in FIG. 2, so as to be brought into contact with the floor or retractably separated from the floor as necessary.

In FIG. 2, reference number 17 refers to a cleaning fluid tank provided within the cleaner housing; cleaning fluid accommodated in tank 17 is conducted to sponges 16a~16f via pump 18, and drips onto the floor from holes provided in the center of sponges 16a~16f. The aforesaid sponges 16a~16f, cleaning fluid tank 17, and pump 18 comprise the cleaning unit. According to the previously described construction, the free-running floor cleaner is capable of cleaning a predetermined range 11 by a driving unit while applying a cleaning fluid to the floor via sponges 16a~16f.

Reference number 19 refers to a floor reflectivity sensor attached to the bottom surface of the cleaner relative to the direction of advance, front side of the cleaning unit, and which is capable of measuring the reflectivity of the floor surface prior to cleaning. The detailed construction of the reflectivity sensor is discussed later. If floor reflectivity sensor 19 is provided on the front side of the cleaning unit relative to the direction of advance of the cleaner, the degree of dirt of the floor surface can be detected without hindering the cleaning operation because the cleaning operation can be accomplished while detecting the degree of dirt of the floor surface prior to cleaning. Floor reflectivity sensor 19 is a part of the floor dirt detection section described later.

Reference number 20 refers to a controller comprising a central processing unit (CPU) and a direct memory unit, and which controls the entire cleaner.

Figure 3:
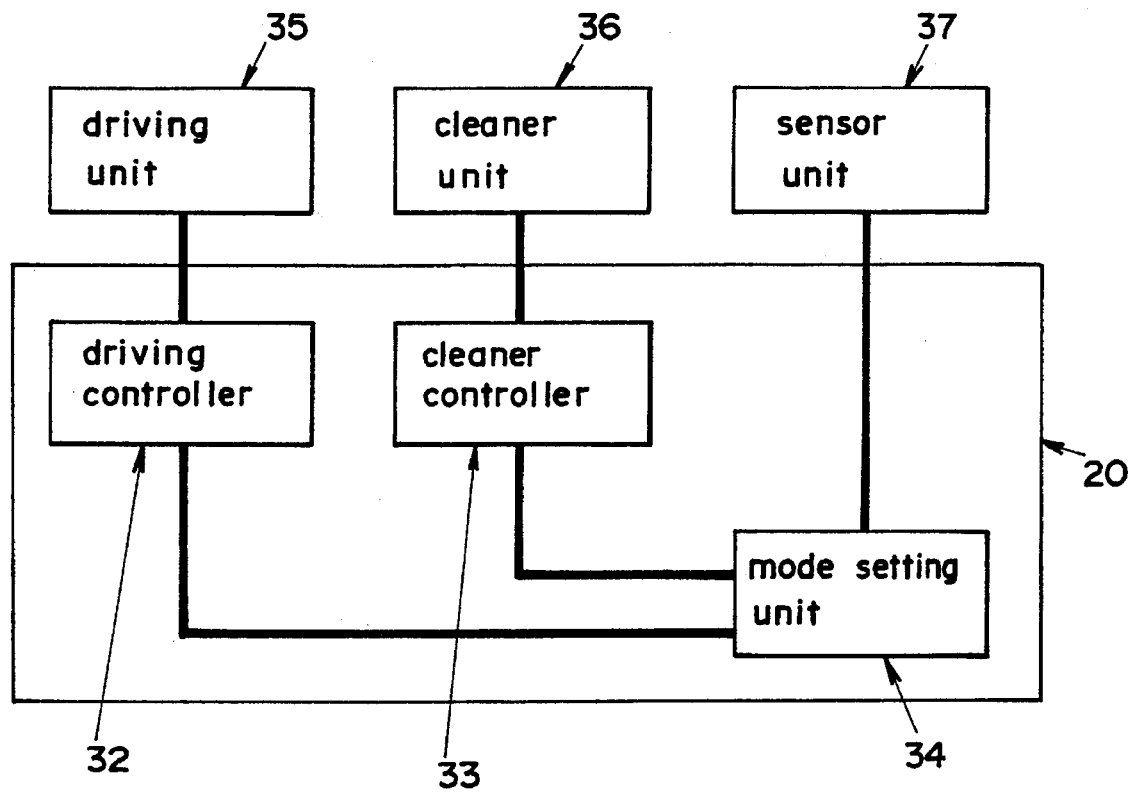
FIG. 3 is a block diagram of the control block of a first embodiment of the cleaner of the present invention.

FIG. 3 is a block diagram of the control block of a first embodiment. Controller 20 is divided into the three functional sections of driving controller 32, cleaning controller 33, and mode setting unit 34. Driving controller 32 controls driving unit 35, and cleaning controller 33 controls cleaning unit 36. Mode setting unit 34 selects the operation travel and cleaning mode in accordance with the results of sensor unit 37, and issues instructions to driving controller 32 and cleaning controller 33.

Figure 4:
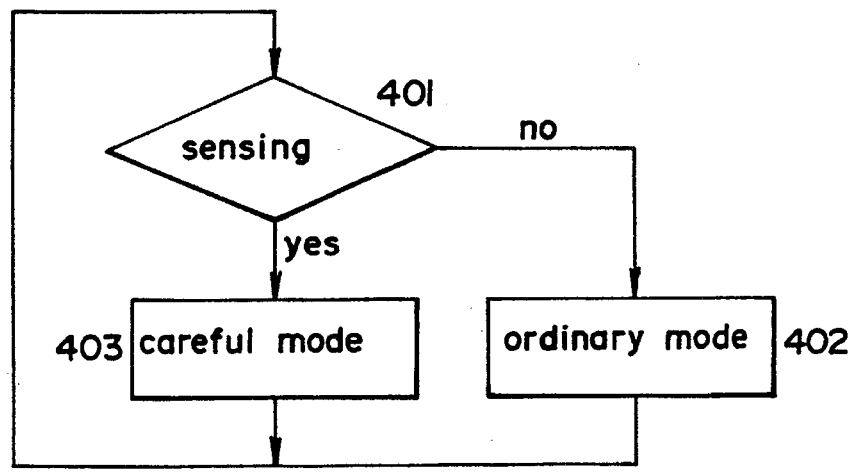
FIG. 4 is a flow chart showing the control method of the first embodiment of the cleaner of the present invention.

FIG. 4 is a flow chart showing the operation of the mode setting unit of the first embodiment. Step #401 is the step for judging the degree of dirt on a floor; during cleaning, the output of floor reflectivity sensor 19 is normally monitored to judge the degree of dirt condition of the floor surface by comparing a predetermined value.

When it is determined that the normal cleaning operation is adequate for cleaning a floor surface, namely the degree of dirt is judged to be lower than the predetermined value by the judgement of step #401, the routine advances to step #402, where the normal mode is selected, and instructions are issued to driving controller 32 and cleaning controller 33. Specifically, instructions are issued to reduce the amount of drops of cleaning fluid, and the rotation of sponges 16a~16f is slowed while advancing at high speed.

When it is determined that heavier dirt is present on the floor surface, namely the degree of dirt is judged to be higher than the predetermined value by the judgement of step #401, the routine advances to step #403, where the careful mode is selected, and instructions are issued to driving controller 32 and cleaning controller 33. Specifically, instructions are issued to increase the amount of drops of cleaning fluid, and sponges 16a~16f are rotated at high speed, while advancing at slow speed.

Thus, the cleaning mode is changeable for severely soiled areas and lightly soiled, such that the time required to clean the entire area can be reduced by allowing careful and precise cleaning for heavily soiled areas and rapidly advancing over areas only lightly soiled. When a cleaning region includes areas that do not require cleaning, or when it is judged that an area is not dirty and a cleaning operation is unnecessary, the cleaning operation of said area is interrupted and the cleaner only moves, thereby allowing faster movement over areas that do not need to be cleaned, thus further reducing the time of the cleaning operation.

Figure 5:
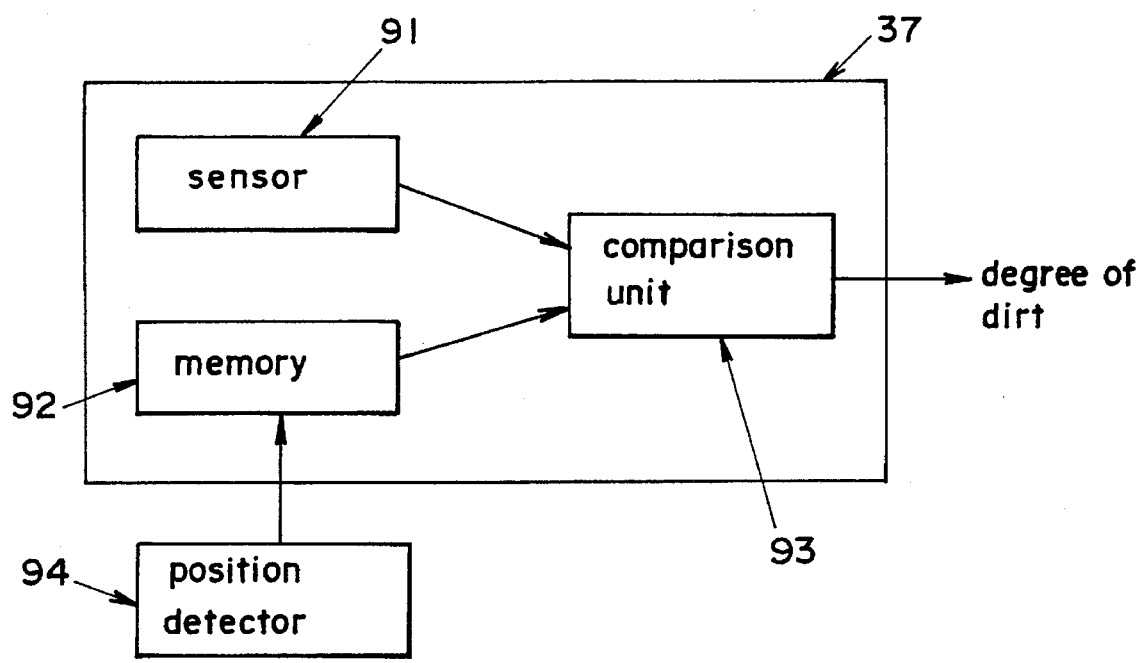
FIG. 5 is a block diagram of the dirt detection section of an embodiment of the cleaner of the present invention.

FIG. 5 is a block diagram of sensor unit 37. Reference number 91 refers to a sensor which quantitatively measures the condition of the floor surface in a state of non-contact. Although, in the present embodiment, a method is described wherein the reflectivity of a floor surface is optically measured using a reflectivity sensor 19, it is to be understood that other types of sensors may be used if such sensors are capable of quantitatively measuring the condition of a floor surface such as changes in the soiled condition of a floor, e.g., odor sensors, moisture sensors using infrared collection and the like. Optical sensors do not damage the floor surface and therefore do not effect the cleaning operation because they can measure at high speed in a state of non-contact with the floor surface.

Reference number 92 refers to a standard value memory which stores the reflectivity value of a floor surface which is not dirty. Reference number 93 refers to a comparison unit which compares the floor surface reflectivity of a clean floor stored previously in memory 92 with a floor surface reflectivity measured by the sensor unit, and calculates the degree of dirt based on the difference in the aforesaid reflectivities.

Figure 6:
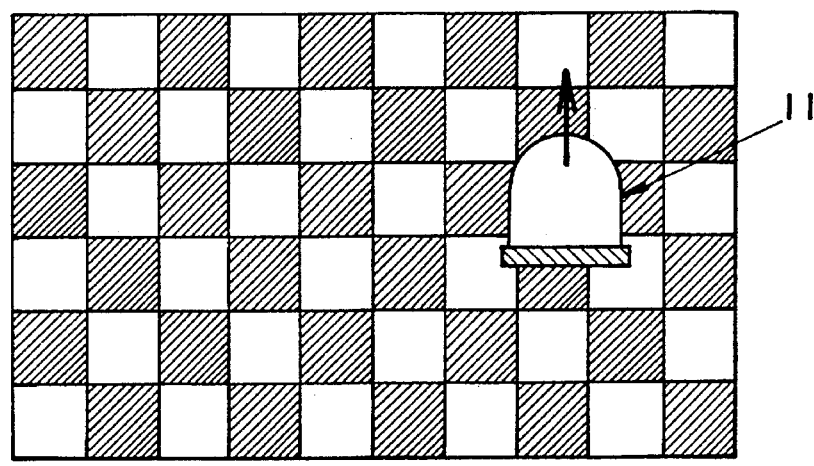
FIG. 6 is an illustration showing an embodiment of the cleaner of the present invention cleaning a room.

The reflectivity of a clean floor surface is stored beforehand in memory 92. FIG. 6 shows the plan of a floor to be cleaned. When the region to be cleaned includes areas having different reflectivity values, such as that shown in FIG. 6, a map of the reflectivities according to position on the floor surface is stored in memory 92.

Thus, by providing the aforesaid memory 92, the degree of dirt of a floor surface can be calculated by detecting the current position of the cleaner by position detector 94, reading the standard reflectivity at the cleaner position from memory 92 based on the detected position information, and comparing the output of sensor 91 in comparison unit 93.

Figure 9:
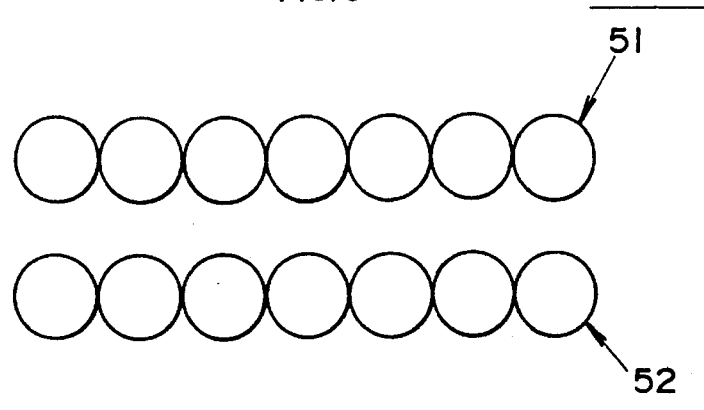
FIG. 9 is a horizontal section view of a floor reflectivity sensor of the dirt detection unit of an embodiment of the cleaner of the present invention.
Figure 10:
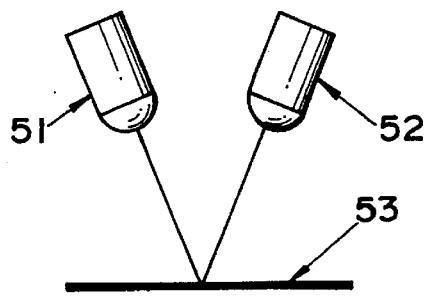
FIG. 10 is a vertical section view of a floor reflectivity sensor of the dirt detection unit of an embodiment of the cleaner of the present invention.

The sensor of sensor unit 37 is described in detail hereinafter with reference to FIGS. 9 and 10.

Reflectivity sensor 19 is mounted in front of sponges 16a~16f relative to the advancing direction (advancing direction is toward the left side in FIG. 1) of the cleaner shown in FIG. 1, and has a long, narrow shape in the horizontal direction so as to be capable of measuring the reflectivity of the entire floor area of the width being cleaned. Sensor 19 is configured so as to have a plurality of arrays of light emitters 51 and light receivers 52, as shown in FIG. 9.

Light emitters 51 are compact photoemitter elements such as, for example, near infrared light emitting diodes (LED), which are mounted so as to confront the floor surface 53. Light receivers 52 are compact photoreceiver elements such as silicon photodiodes, which are mounted at positions allowing the reception of reflected light reflected from the floor surface 53. Furthermore, the photoreceptor sensor may use a linear sensor instead of an individual sensor array.

Whether or not the floor surface is soiled is judged by amplifying the intensity of the light that is emitted from light emitter 51 and reflected from the floor surface which impinges light receiver 52 via a sensor amplifier not shown in the drawings, and comparing said output with reflectivity data previously stored in memory. Furthermore, the degree of dirt on the floor can be detected by the absolute amount of the difference between the stored reflectivity and the actual reflectivity of the floor surface.

Since the positional relationship between the reference position on the cleaner and the various sensor elements is predetermined, it is possible to detect the degree of dirt at specific coordinates on the floor surface.

Figure 8:
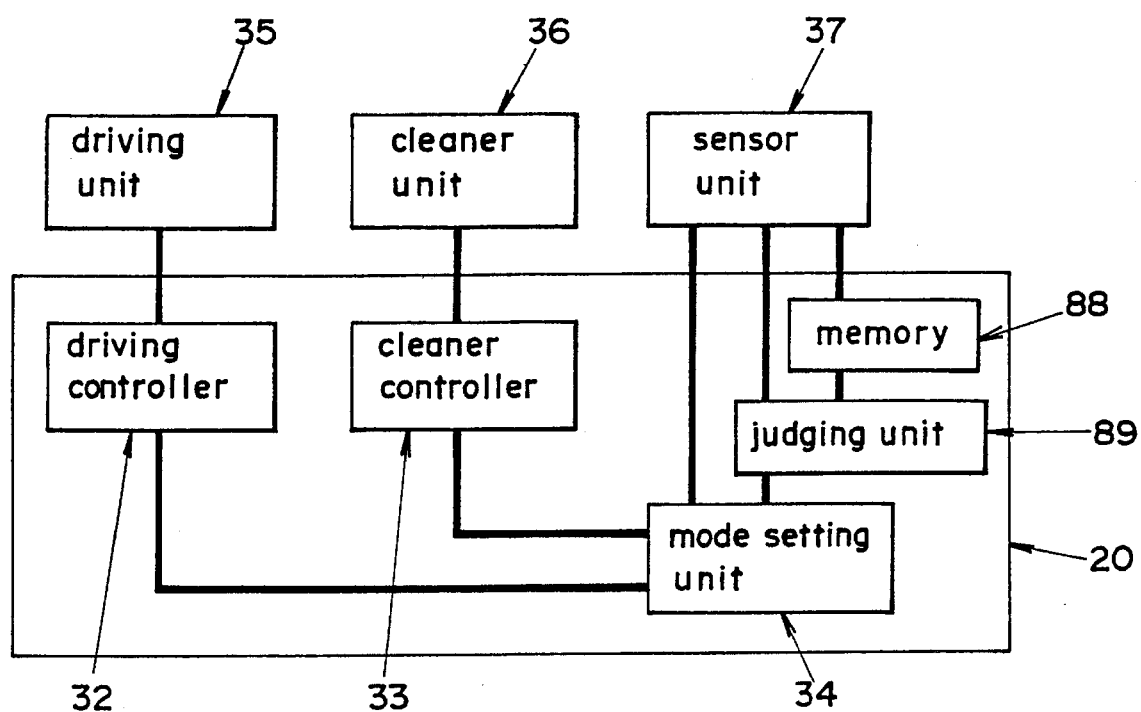
FIG. 8 is a block diagram of the control block of a second embodiment of the cleaner of the present invention.

FIG. 8 is a block diagram of the control block of a second embodiment. In the drawing, components having the same function as previously described for the first embodiment (FIG. 3) are designated by like reference numbers. In the present embodiment, the output of sensor unit 37 is stored in memory 88, and judging unit 89 determines the cleaning effectiveness by comparing the degree of dirt stored in memory 88 with the degree of dirt at the same position after a cleaning operation.

Mode setting unit 34 selects the cleaning mode and operation travel in accordance with the result of sensor unit 37 or judging unit 89, and issues instructions to driving controller 32 and cleaning controller 33.

Figure 7:
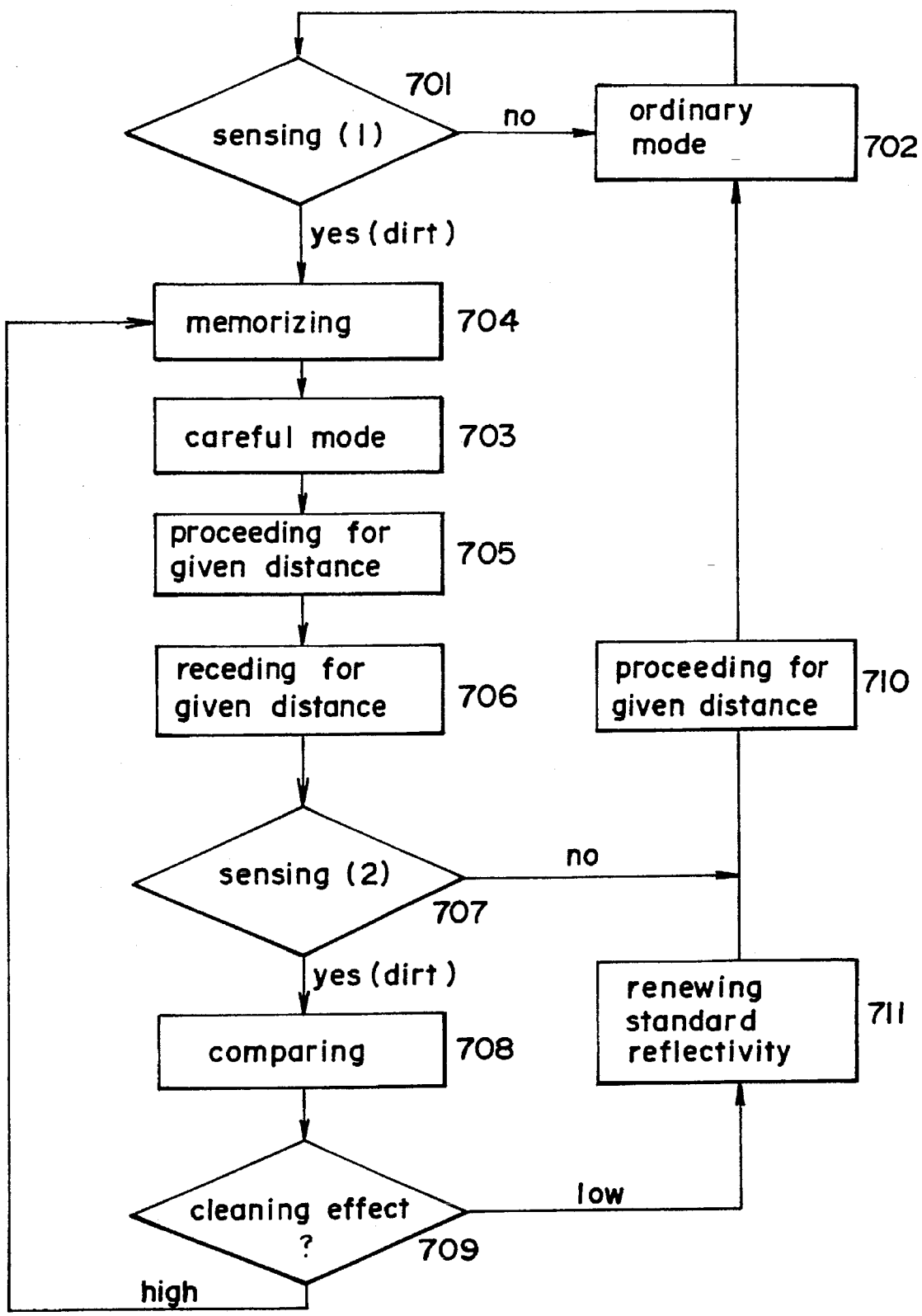
FIG. 7 is a flow chart showing the control method of a second embodiment of the cleaner of the present invention.

FIG. 7 is a flow chart showing the operation of the mode setting unit of the second embodiment. Step #701 is dirt detection step (1), and determines the dirt on the floor surface by normally monitoring the output of reflectivity sensor 19 during cleaning. This determination is accomplished by comparing the output of reflectivity sensor 19 with the standard reflectivity stored as a map in memory 92.

When it is determined that there is no dirt on the floor surface, the routine advances to step #702, and the normal mode issues instructions to driving controller 32 and cleaning controller 33. A method wherein the cleaning operation is skipped may also be used depending on circumstances.

When it is determined that dirt is present on the floor surface in step #702, the routine advances to step #704, and, after the dirt condition of the floor surface as just determined is stored in memory 88, the careful cleaning mode instructions are issued to driving controller 32 and cleaning controller 33 in step #703.

Then, in step #705, cleaning continues for a uniform distance in the careful mode, after which cleaning occurs backward in step #706 for the same distance as was advanced in step #705, such that the cleaner is returned to the initial position at which dirt was detected. When cleaning effectiveness is high by cleaning in one direction, the cleaning unit, i.e., sponges 16a–16f, may be retracted from the floor surface during the return travel of step #706.

In dirt detection step (2) (#707), the condition of dirt on the floor surface is again determined from the output of reflectivity sensor 19. When the floor surface is found to be dirt-free, the cleaner is returned to its previous starting position from the advanced position in step #710, then in step #702 the normal mode instructions are issued to driving controller 32 and cleaning controller 33.

Conversely, when the floor surface is determined to be dirty in step #707, the routine advances to step #708, and current degree of dirt is compared to the degree of dirt previously stored in memory 88 in step #704, then cleaning effectiveness is determined in step #709.

When the degree of dirt is found to be low in step #709, it indicates there was little cleaning effect, and the routine continues to step #711 where the standard reflectivity of the current position stored as a map in memory 88 of sensor unit 37 is renewed to a value corresponding to the sensor output value of the current position.

When a judgement for a next cleaning operation is made for a location identical to a previous location, an updated standard reflectivity is used, such that cleaning by the normal mode can continues for locations which are damaged or have had no cleaning effect. Of course, when new dirt adheres at these locations and the new dirt causes a change in reflectivity from the standard one, the careful cleaning mode is used.

Then, the cleaner is returned to its previous position after advancing a uniform distance in step #710, and cleaning in the normal mode continues in step #702.

Conversely, when the degree of dirt before cleaning is compared with the degree of dirt after cleaning and the degree of dirt is founded to be high in step #709, the routine continues to step #704, careful cleaning mode instructions are again issued to driving controller 32 and cleaning controller 33, and the previously described steps of #705–#709 are repeated.

In the present embodiment, an alternative method may be used wherein the condition of dirt on the entire floor surface to be cleaned is measured beforehand by sensor unit 37 and stored, instead of step #701, the operation mode may be switched based on the stored condition of dirt for the current position of the cleaner with not difference in the effectiveness of the present invention.

As previously described, the cleaner of the present invention is capable of quickly cleaning a predetermined cleaning range by providing a sensor for detecting the degree of dirt of the object to be cleaned, and a driving controller to control the movement of the cleaner in accordance with the degree of dirt of the object to be cleaned.

The cleaner of the present invention is capable of judging whether or not dirt is dropped by a cleaning operation, or dirt is not dropped by a cleaning operation so as to damage a floor surface to achieve excellent cleaning effectiveness by providing a controller to determine cleaning effect by comparing the degree of dirt of an object being cleaned before and after cleaning.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A cleaner comprising:
   a driving unit;
   a cleaner unit which cleans an object to be cleaned;
   a sensor which detects the reflectivity of the object to be cleaned; and
   a driving controller which controls the driving unit on the basis of the detected reflectivity.

2. A cleaner as claimed in claim 1, wherein the driving controller controls the driving unit so that the cleaner moves at high speed when the sensor detects that the reflectivity is higher than a predetermined value.

3. A cleaner as claimed in claim 2, further comprising a cleaning controller which controls the cleaner unit on the basis of the reflectivity detected by the sensor.

4. A cleaner as claimed in claim 1, wherein the sensor comprises a light emitter emitting light toward the object and a light receiver receiving light reflected on the object so as to measure the reflectivity of the object.

5. A cleaner as claimed in claim 4, wherein the cleaner further comprises a memory memorizing a standard reflectivity of the object, and the sensor calculates the degree of dirt by means of comparing the measured reflectivity with the standard reflectivity.

6. A cleaner as claimed in claim 5, wherein the memory comprises a plurality of standard reflectivity each of which corresponds to a position of the object.

7. A cleaner as claimed in claim 1, wherein the object is a floor and the cleaner runs on the floor.

8. A cleaner comprising:
   a driving unit;
   a cleaner unit which cleans an object to be cleaned, said cleaner unit comprising a material rotated in order to scrub the object;
   a sensor which detects the reflectivity of the object to be cleaned;
   a driving controller which controls the driving unit on the basis of the reflectivity so that the cleaner moves at a higher speed when the sensor detects that the reflectivity is higher than a predetermined value; and a cleaning controller which controls the cleaner unit on the basis of the reflectivity detected by the sensor.

9. A cleaner as claimed in claim 8, wherein cleaning fluid drips from the material.

10. A cleaner as claimed in claim 9, wherein the cleaning controller reduces the amount of the cleaning fluid dripped from the material when the sensor detects that the reflectivity is higher than the predetermined value.

11. A cleaner as claimed in claim 8, wherein the cleaning controller reduces the rotating speed of the material when the sensor detects that the reflectivity is higher than the predetermined value.

12. A cleaner comprising:

a cleaner unit which cleans an object to be cleaned;

a sensor which detects the reflectivity of the object to be cleaned; and a controller which judges cleaning effect of the cleaner unit by means of comparing the reflectivity before and after a cleaning operation.

13. A cleaner as claimed in claim 12, wherein the cleaner unit repeats the cleaning operation until the reflectivity detected by the sensor is higher than a predetermined value if the controller judges the cleaning effect is high.

14. A cleaner as claimed in claim 12, wherein the cleaner unit stops the cleaning operation on an area where the controller judges the cleaning effect is low.

15. A cleaner as claimed in claim 12, wherein the sensor comprises a light emitter emitting light toward the object and a light receiver receiving light reflected on the object so as to measure the reflectivity of the object.

16. A cleaner comprising:

a driving unit;

a cleaner unit which cleans an object to be cleaned; and a sensor by which a degree of dirt on the object is detected by means of measuring reflectivity of the object, said sensor being located before the cleaner unit relative to the direction of advance of the driving unit.

17. A cleaner as claimed in claim 16, wherein the sensor comprises a light emitter emitting light toward the object and a light receiver receiving light reflected on the object so as to measure the reflectivity of the object.

18. A moving cleaner which cleans an object while moving comprising:

a sensor by which a reflectivity of the object is detected;

a memory in which a plurality of standard reflectivity, each of which corresponds to a position of the object, are memorized;

a comparator which compares the detected reflectivity with the standard reflectivity corresponding to the position of the object; and a controller which controls a cleaning operation on the basis of an output of the comparator.

19. A moving cleaner as claimed in claim 18, wherein the controller controls the cleaning operation on the basis of the detected reflectivity and the standard reflectivity corresponding to a position where the sensor detects the reflectivity.

20. A moving cleaner as claimed in claim 19, wherein the memory memorizes the detected reflectivity as a new standard reflectivity when a cleaning effect at a position is low.

21. A moving cleaner as claimed in claim 18, further comprising:

a driving unit which moves the cleaner;

and wherein the controller controls the driving unit so as to control the cleaning operation.

22. A moving cleaner as claimed in claim 18, further comprising:

a cleaner unit which cleans the object to be cleaned;

and wherein the controller controls the cleaner unit so as to control the cleaning operation.

23. A cleaner comprising:

a driving unit which moves the cleaner;

a sensor which is located behind the driving unit relative to the direction of advance of the driving unit, said sensor detecting the reflectivity of the object to be cleaned; and a cleaner unit which is located behind the sensor relative to the direction of advance of the driving unit, said cleaner cleaning an object to be cleaned.

24. A cleaner as claimed in claim 23, further comprising:

a controller which controls a cleaning operation on the basis of detected reflectivity.

25. A cleaner as claimed in claim 24, wherein the controller controls the driving unit so as to control the cleaning operation.

26. A cleaner as claimed in claim 24, wherein the controller controls the cleaner unit so as to control the cleaning operation.

* * * * *